April 8, 1941.

W. R. FOLAND ET AL 2,237,913

AUTOMOBILE HEAD PULLER

Filed Dec. 14, 1938

INVENTORS.
WILLIAM R. FOLAND.
OTTO D. MOYER.

BY Lockwood, Goldsmith & Galt
ATTORNEYS.

Patented Apr. 8, 1941 2,237,913

UNITED STATES PATENT OFFICE 2,237,913

AUTOMOBILE HEAD PULLER

William R. Poland and Otto D. Moyer, Indianapolis, Ind.; said Moyer assignor to said Poland Application December 14, 1938, Serial No. 245,583

2 Claims. (Cl. 29—84)

This invention relates to a tool for removing the head from the cylinder block of an internal combustion engine, the object being to provide an efficient tool for this purpose.

This operation, as is well known, is frequently necessary in the repair and maintenance of such engines. At present it is accomplished largely by hand with the assistance of a screw driver or similar tool to break the seal sometimes present by reason of the shellac or hard oil employed in affixing the gasket to the cylinder block. This method has proven generally unsatisfactory, as would be expected, and an efficient tool for the task has long been needed. That it is still adhered to is a strong indication that the cylinder head pullers now available are not practicable.

In instances of aluminum heads where the head has expanded around the studs, which extend upwardly from the cylinder block, it has sometimes been necessary to break the head to remove it. While the tool herein described will not remove intact all such expanded heads the task, when possible of accomplishment, can be done with much less difficulty. The chief advantage of the tool, however, lies in its convenience and the fact that it is a great time saver. This latter advantage is especially significant in connection with busy city garages doing a large amount of repair work.

A feature of the invention resides in the novel manner in which a plurality of the studs penetrating through the head from the cylinder block are utilized to elevate the head to a position from which it can be easily removed by hand.

Reference will now be had to the accompanying drawing wherein.

Figures 1, 2, 3:
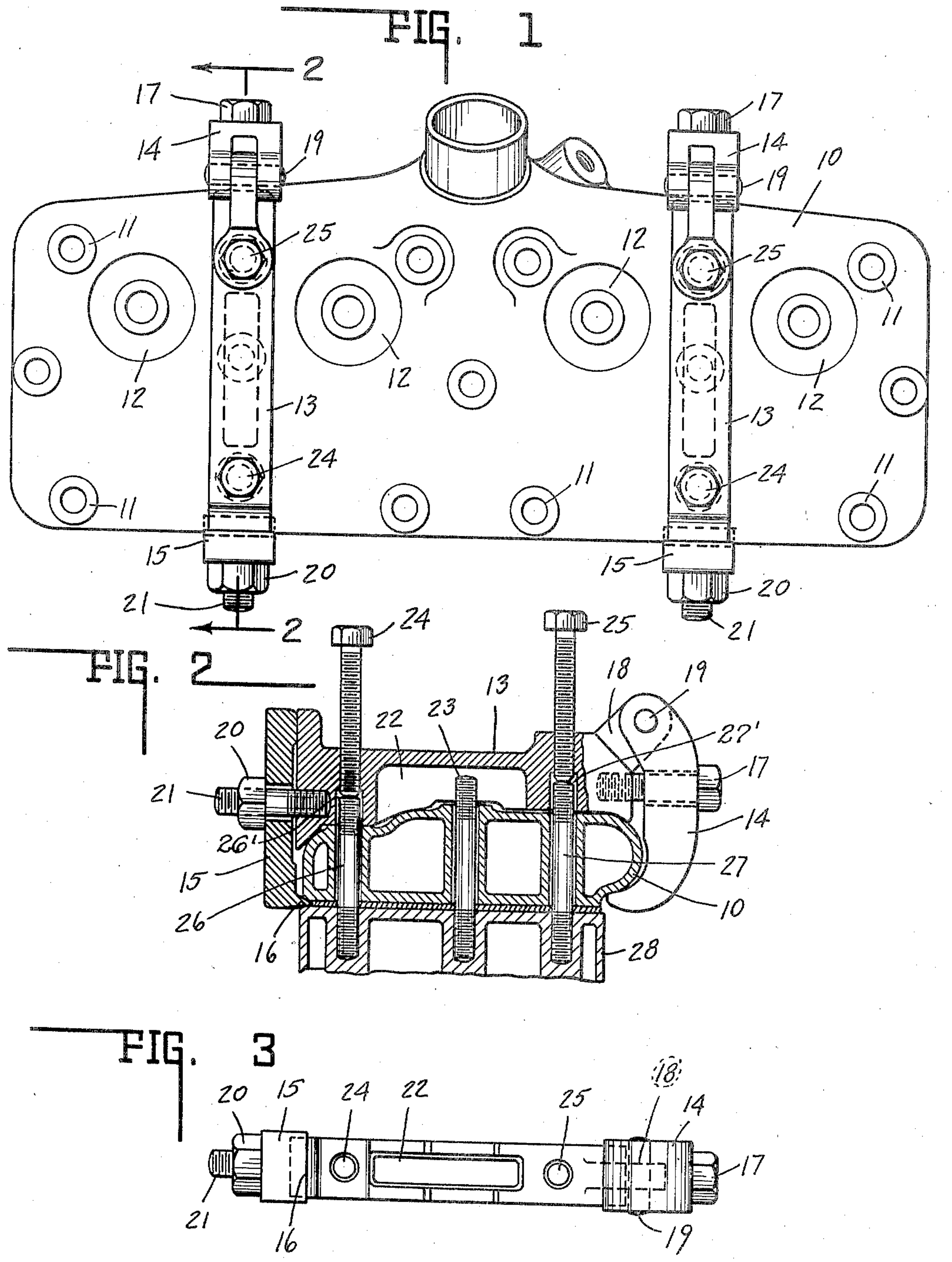
Fig. 1 is a top plan view showing two of the tools as applied to a cylinder head which is in raised position above the studs in the cylinder block.
Fig. 2 is a vertical section taken on the line 2—2 of Fig. 1 and looking in the direction of the arrows.
Fig. 3 is a view of the underneath side of the tool.

In Fig. 1, 10 denotes a cylinder head, 11 stud holes therein and 12 spark plug holes. The tool includes three main parts, a body or cross member 13, a hook clamp 14 hingedly connected thereto, and a vertical wedge clamp 15 having a wedge portion 16. In the manufacture of the tool the parts are made to conform with the size and contour of the particular cylinder head upon which it is to be used. The conformation of some heads may demand a tool having end pieces of almost identical character. In the Packard, for example, a tool is required having two wedge members, the second wedge being substituted for the hook clamp. This second wedge may be either hingedly connected to the body member or bolted thereto in the manner of the other wedge.

The screw 17, which may be a cap screw, serves to tighten the clamp 14 to the head. The hinge lug 18 for the hinge pin 19 is integral with the cross member 13. Clamp 14 is bifurcated to embrace the hinge lug 18.

The wedge clamp is bolted to the body member by the nut 20, as best shown in Fig. 2, the stud 21 being embedded in the cross member 13. While there is some advantage to this construction a screw, such as a cap screw, can be employed as in connection with the hook clamp.

The cross member 13 has a hollow space 22 on the under side to give clearance to the stud 23 over which it lies. This space may or may not be necessary, depending upon the make of engine. When the tool is in position screws 24 and 25 in the cross member are in contact with studs 26 and 27 which extend upwardly into bores 26' and 27' of the cross member. Studs 26 and 27, in addition to serving as bearing surfaces for the screws, prevent lateral movement of the cross member and disalignment of the screws.

It will be observed that the screws are so spaced on the body or cross member that if turned evenly there will be no tilting and consequent jamming of the head against the studs.

To apply the tool the nut 20 and the screws 17, 24 and 25 are first loosened. The tool is then placed upon the head to be removed and the screw 17 tightened until screws 24 and 25 are in line with the studs 26 and 27. The nut 20 is then tightened to force the wedge on the wedge clamp 15 between the head and the cylinder block 28. Elevation of the head is thereafter effected by turning the screws 24 and 25. Care should be exercised to raise the head evenly so as to prevent jamming against the studs.

The invention claimed is:

1. A tool for separating the cylinder head from a cylinder block having upwardly extending studs, including an elongated body member adapted to be mounted over a head to be removed, said member being provided with a bore on either side of its transverse median line for stud reception, said bore being of a diameter slightly greater than a stud, a pair of gripping members connected to said body member, each adapted for gripping the sides of a head and securing the body member thereto, a screw threaded bore in alignment with each stud bore extending from said bore through the opposite side of the body, and a screw in each threaded bore for bearing upon a stud within each stud bore of said body member for elevating the head.

2. A tool for separating the cylinder head from a cylinder block having upwardly extending studs, including an elongated body member adapted to be mounted over a head to be removed, said member being provided with a bore on either side of its transverse median line for stud reception, said bore being of a diameter slightly greater than a stud, means adapted to secure said body member to the head, and a plurality of screws threaded through said body member, each aligned with a stud bore and adapted to bear upon a stud within said stud bore for elevating the head.

WILLIAM R. POLAND.
OTTO D. MOYER.